May 4, 1965
J. D. WATTS
3,181,901
INSTANT RELEASE CONNECTION WITH A REDUCED
EFFECTIVE ANGLE OF FRICTION
Filed May 3, 1962
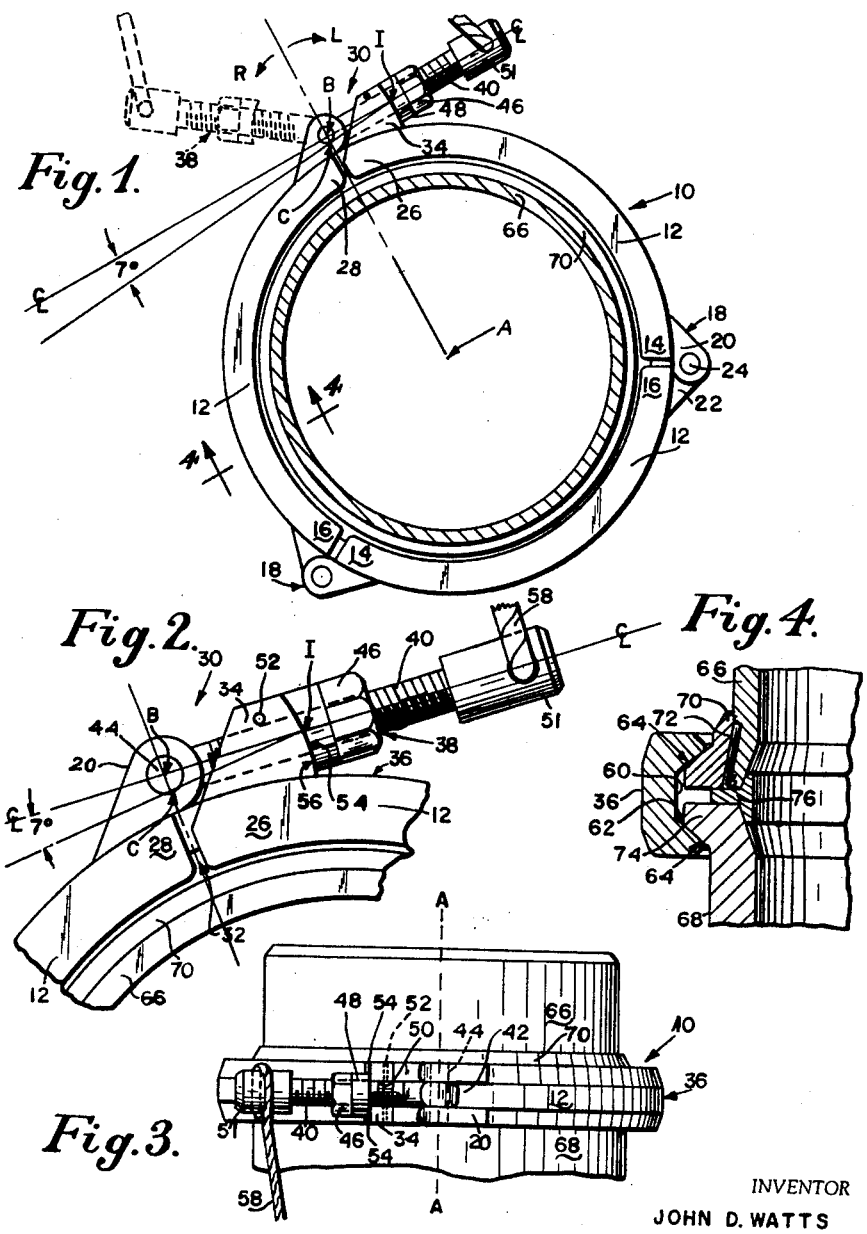
INVENTOR
JOHN D. WATTS
BY
ATTORNEYS

United States Patent Office 3,181,901
Patented May 4, 1965

3,181,901
INSTANT RELEASE CONNECTION WITH A REDUCED EFFECTIVE ANGLE OF FRICTION
John D. Watts, P.O. Box 2291, Houston, Tex.
Filed May 3, 1962, Ser. No. 192,278
6 Claims. (Cl. 285—367)

The present invention relates generally to a releasable coupling for joining separable members and has particular reference to an instant release connection for detachably securing the separated terminal portions of an annular clamping assembly, and is a continuation of my copending application Serial Number 750,126 filed July 22, 1958 and now abandoned.

This invention is directed primarily to reducing the manual force required to release various frictionally interlocked members of the releasable connection so that the clamping assembly may be quickly and easily disconnected during an emergency with a minimum of effort.

It is a principal object of the present invention to provide an instant release connection that may be manually adjusted to control the radially constrictive clamping action of the annular clamping assembly for safely, simply and positively sealing the separable members together.

Another important object of the present invention is to provide an instant release connection for a fluid tight joint which includes a sealing ring of hard metal or the like disclosed in U.S. Letters Patent 2,766,829, 2,766,998 and 2,766,999. In these patents, there is disclosed a joint connection which includes a unitary sealing ring of hard metal or the like having exterior tapered sealing surfaces which are inclined a greater angle to the longitudinal axis than the sealing surface on the flexible sealing ring, and when the elements are moved together, the sealing ring is flexed into stressed co-extensive sealing engagement with the joint sealing surfaces. According to this invention, there is provided the combination of sealing means here described, together with instant release means operative to separate the joint in a new and improved manner.

More specifically, it is an important object of the present invention to provide a releasable connection which utilizes complementary arcuate bearing surfaces aligned to frictionally engage each other in superposed interlocking relation with the axis of curvature thereof offset by an amount sufficient to reduce the effective angle of friction therebetween.

Still another object of the invention is to provide an improved releasable connection of wide and varied utility, which is positive in operation and at the same time is durable so as to withstand repeated usage without impairment of efficiency, which is of simple design and inexpensive to manufacture, and which is fully reliable and otherwise well adapted for the purposes for which the same is intended.

Other objects and the entire scope of the present invention will become apparent in the detailed description given hereinafter. It should be understood, however, that the detailed description and specific examples, while indicating the preferred embodiments of the invention, are given by way of illustration only, since various changes and modifications within the spirit and scope of the invention will become apparent as the detailed description herein progresses.

Reference being made to the accompanying drawing forming a part hereof, wherein like numerals refer to like parts throughout, and in which:

FIGURE 1 is a front elevational view illustrating an instant release connection constructed in accordance with this invention and arranged to detachably secure the separated terminal portions of an annular clamping assembly;

FIGURE 2 is an enlarged fragmentary elevational view of the instant release connection and associated annular clamping assembly shown in FIGURE 1;

FIGURE 3 is a top plan view of the instant release connection moved to latched position; and FIGURE 4 is a fragmentary sectional view, taken along the line 4—4 of FIGURE 1, illustrating the cooperative relation between the clamping assembly, sealing ring, and separable conduit members.

Referring now to the drawings in detail wherein for purposes of illustration there is described a preferred embodiment of the present invention, the releasable coupling comprises a generally annular clamping assembly 10 having a plurality of arcuate segmental clamping elements 12 circumferentially arranged with adjacent end portions 14 and 16 pivotally interconnected by suitable hinges 18 for relative movement transversely of the longitudinal axes A of the coupling. The hinges 18 preferably are formed by a bifurcated lug or ear 20 and an interfitting tongue 22 joined by hinge pin 24 which serves as a pivotal axes disposed substantially parallel to the longitudinal axes of the coupling. The segmental clamping elements 12 may be individually replaced when worn or damaged by merely removing pin 24 from the associated hinge 18 to separate the adjacent end portions 14 and 16.

While in the illustrative embodiment an annular clamping assembly 10 is shown having three arcuate segmental clamping elements 12 with pivotal interconnections spaced 120° apart, it should be understood that a suitable clamping assembly could be formed from either a unitary clamping ring having a pair of separated terminal portions facing each other in circumferentially spaced relation or from any number of pivotally interconnected segmental clamping elements necessary to arcuately define an annular clamping assembly.

The separated and opposed terminal or free-end portions 26 and 28 of any two adjacent clamping elements 12 may be detachably secured by an instant release connection, generally designated by the numeral 30. The releasable connection 30 serves to control the radially constrictive clamping action of the assembly 10 and may be repeatedly released and resecured without requiring re-establishment of the initial adjustment. For purposes presently apparent, the pivotally interconnected segmental clamping elements 12 have been designed so that when the releasable connection 30 is tightened, the terminal portions 26 and 28 will be circumferentially drawn toward one another but will not meet; being separated by a space 32 between the ends thereof.

Instant release connection 30 as shown generally comprises a stationary shoulder member 34 disposed on the outer peripheral face 36 of one of the clamping elements adjacent terminal portion 26 thereof and a releasable connecting member 38 pivotally secured to the other terminal portion 28 of the adjacent clamping element for swinging movement about axis B extending substantially parallel to the longitudinal axis A of the coupling 10. The releasable connecting member 38 is arranged to move between a latched or secured position L adjacent shoulder member 34 and a released position R removed therefrom, as illustrated in FIGURE 1, and includes a longitudinally threaded connecting bolt or lever 40 pivotally secured at one end between the spaced portion 42 of the bifurcated lug or ear 20 by a pin 44. An adjusting member 46, in the form of a nut, is threadably secured to the connecting bolt 40 intermediate the ends thereof, while a releasable locking member or latch 48, preferably in the form of a washer, is slidably disposed on connecting bolt 40 between pivot pin 44 and adjusting member 46. The releasable locking member 48 may be moved longitudinally along connecting bolt 40 and aligned to frictionally engage shoulder member 34 when connecting member 38 is swung to a latched position.

In the present embodiment, the central portion of shoulder member 34 has been recessed or cut out at 50, as shown in FIGURE 3, in order to receive the elongated bolt 40. An arcuate bearing surface 54 is formed along the outer trailing face of shoulder member 34 having an axis of curvature C offset below and extended substantially parallel to the pivotal axis B of connecting member 38, for reasons which will become readily apparent. The releasable locking member or washer 48, slidably carried by connecting bolt 40, also has an arcuate bearing surface 56 formed along the inner leading face thereof complementary in curvature to the arcuate bearing surface 54 formed on shoulder member 34.

In use and operation, connecting member 38 may be manually swung from a released position R, shown in phantom in FIGURE 1, to a latched position L adjacent shoulder member 34 so as to detachably secure the separated terminal portions 26 and 28 in the following manner. Connecting bolt 40 enters recess 50 and extends longitudinally beyond shoulder member 34 so that arcuate bearing surface 56, formed along the inner leading face of the washer 48, is positioned to register with the complementary bearing surface 54 formed along the outer trailing face of shoulder member 34 in superposed interlocking relation. Adjusting nut 46 is then tightened against locking member 48 which in turn frictionally engages shoulder member 34 drawing terminal portions 26 and 28 circumferentially toward one another. Once the releasable connection 30 has been adjusted in the aforementioned manner, the clamping assembly 10 may be repeatedly released and reconnected without requiring re-establishment of the initial adjustment.

The force needed to manually separate the various frictionally interlocked members of the releasable connection 30 may be effectively reduced to a minimum in the following manner. If the axis of curvature C of the complementary arcuate bearing surfaces 54 and 56 is offset below the pivotal axis B of connecting member 38, the effective angle of friction therebetween will be reduced which in turn will proportionally reduce the manual releasing force needed to overcome the tensional force exerted by adjusting member 46. For example, when the axis of curvature C is located along an imaginary line extending from the pivotal axis B of connecting member 38 to the longitudinal axis A of coupling 10, the radius of curvature of arcuate bearing surfaces 54 and 56 will intersect the imaginary longitudinal center line CL of connecting bolt 40 at I to define an angle of approximately 7 degrees reducing the effective angle of friction therebetween to approximately 2 degrees thereby reducing the manual releasing force needed to overcome the makeup load of nut 46 and the related frictional camming action between washer 48 and shoulder member 34 to approximately 1/30th of the tensional load on bolt 40. While it is not essential that the axis of curvature be located on the imaginary line extending between the pivotal axis of the connecting member and the longitudinal axis of the coupling, it should be noted that the axis of curvature C should not be offset more than 10 degrees from the pivotal axis B of connecting member 38, otherwise the washer 48 would separate from the shoulder member 34 without requiring any external manual force. Furthermore, if the axis of curvature C and the pivotal axis B were not offset but axially aligned, the connection 30 could not be broken and re-secured without first backing off the adjusting member 46 to separate the washer 48 from the shoulder member 34. In other words, it is essential that the axis of curvature be offset from the pivotal axis of the connecting member by an angular amount sufficient to reduce the effective angle of friction between the complementary arcuate bearing surfaces so that the circumferential dimension of the clamping assembly 10 may be initially adjusted and thereafter repeatedly re-established as previously adjusted.

When the connecting member 38 is in latched position, a shear or locking pin 52 may be inserted through shoulder member 34 for securing the connecting bolt 40 against accidental removal. However, upon removal of pin 52, connecting member 38 may be swung outwardly away from shoulder member 34 by manually grasping lanyard 58, which is secured to the other end of connecting bolt 40 by cap 51, to quickly open the clamping assembly 10. When the releasable connection 30 is tightened to complete the coupling, as will be readily understood, the clamping assembly 10 will act upon the separable conduit or pipe members 66 and 68 to move them axially inwardly toward each other. That is, as the pivotally interconnected clamping elements 12 of the annular clamping assembly 10 are radially drawn together, the separable members will be forced together axially.

Referring now to FIGURE 4, a continuous circumferential channel 60 is formed on the respective inter-peripheral face of each segmental clamping element 12. The inner walls 62 of the continuous channel 60 may be bevelled or inclined to provide opposed, generally conical wedging surfaces, corresponding in taper or angularity to the outer conical wedging surfaces 64 formed on the end sections of the separable conduit or pipe members 66 and 68, preferably in the manner disclosed and described in United States Letters Patent 2,766,829, 2,766,998 and 2,766,999 of Watts et al., granted to the present inventor on October 16, 1956, to which reference is made.

It will, of course, be understood in this connection that the present clamping assembly is equally applicable to the coupling of conduit or pipe sections fitted with coupling sleeves or members of different designs and type and secured to the pipe sections in any conventional manner, it being merely necessary to form a circumferential channel 60 to fit such other or particular pipe coupling sleeves or members.

As an example, a steel adapter hub or nipple 70 may be threadably secured to the end section of the aluminum conduit member 66 and locked in position by means of a pin 72, as illustrated in FIGURE 4, to prevent accidental disengagement. Alternatively, the end section of the other conduit member 68 may be flared to form a wedging flange 74 as more fully described in the said Letters Patent of Watts et al. The separable members 66 and 68 may be joined and sealed by drawing them inwardly toward each other and into contact with any type of seal, such as sealing ring 76, to the position shown in FIGURE 4.

The inward movement of the conduit parts into forceable engagement with the sealing ring is utilized to effect a sealing action of the type set forth in the aforementioned Letters Patent issued to this inventor, which disclosures are incorporated into the present application by reference.

As disclosed in these patents to Watts et al., the sealing ring 76 is in the form of a one-piece ring of hard metal or the like including a central rib together with oppositely extending sealing lips. The sealing lips include exterior sealing surfaces normally inclined to the longitudinal axis of the joint a lesser angle than the adjacent tapered sealing surfaces of the conduit ends 66 and 68. However, when the conduit members 66 and 68 are moved towards one another the flexible lips of the sealing ring 76 are deflected into stressed, co-extensive sealing engagement with the conduit sealing surfaces.

Due to the symmetrical design of the clamping assembly and the corresponding design of the cooperative conduit parts along with the associated sealing ring, assembly of the releasable coupling will automatically align the conduit parts with the sealing ring. Further, the sealing ring will serve to automatically space the conduit parts in predetermined relationship, since when the coupling is completed the end surfaces of the conduit parts will invariably be in firm contact with the bearing surfaces of the sealing ring, defined by the central rib.

The completed coupling is exceedingly rigid, since the end surfaces of the conduit parts are in firm contact with the sealing ring. Thereafter, no further flexure or movement in the coupling is possible, and no movement between the elements thereof can occur, so that wear, deformation and leakage are precluded.

As previously described, an appropriate seal 76 is placed between the manually aligned separable conduit members 66 and 68. The opened clamping assembly 10 is then suitably disposed around the loosely butting coupling flanges 64. Connecting member 38 is then moved to latched position aligning the arcuate bearing surface 56 formed on washer 48 with the complementary bearing surface 54 formed on shoulder member 34, as illustrated in FIGURE 2. In such position, washer 48 may be drawn into frictional engagement with shoulder member 34 by means of adjusting member 46. As adjusting member 46 is tightened against washer 48, the complementary bearing surfaces will co-act to draw the separated terminal portions 26 and 28 toward one another which in turn will cause the marginal or sidewalls 62 of channel 60 to assert a wedging pressure upon the annular shoulder 64 of conduit members 66 and 68 thereby drawing the same axially together against seal 76 to form a tight leak-proof coupling, as seen in FIGURE 4.

It is to be understood that, although a preferred embodiment of the invention has been shown in the drawing and described with considerable particularity in the foregoing specification, the invention is not limited to the specific details of construction, shown and described, but includes all modifications coming within the scope of the appended claims and their equivalents.

What is claimed is:

1. An instant release connection for peripheral engagement with adjacent flanged ends of pipe and the like comprising: a plurality of arcuate segmental clamping elements pivotally connected to define an annular clamping assembly, said clamping elements having a circumferential recess for peripheral engagement with said flanged ends and having adjacent free ends; a shoulder member extending from one of said free ends; a threaded connecting bolt pivotally secured at one end to said other free end for movement about an axis substantially parallel to the longitudinal axis of the clamping assembly; an adjusting member threadably secured to said connecting bolt; a releasable locking member carried by said connecting bolt between the pivotal axis thereof and said adjusting member, said shoulder member and locking member having complementary arcuate bearing surfaces formed thereon and aligned to freely engage one another in overlapping, interlocked relationship, said bearing surfaces having a common axis of curvature offset towards the longitudinal axis of said annular clamping assembly with respect to the pivotal axis of said connecting bolt an amount sufficient to reduce the effective angle of friction therebetween when said bearing surfaces are engaged.

2. A pipe joint including the structure of claim 1; opposed pipes having adjacent outwardly flared interior end surfaces; a T-shaped metallic ring, the leg of said T-shaped ring being positioned between the adjacent pipe ends; flanges carried by said pipe ends for cooperative engagement with said peripheral recess, said flanges and said recess being cooperatively tapered, whereby engagement of said locking member and said shoulder provides a sealing engagement between said pipes.

3. The structure of claim 1, wherein the axis of curvature of said bearing surfaces is located substantially along an imaginary line extending between the pivotal axis of said connecting bolt and the longitudinal axis of the annular clamping assembly when the complementary bearing surfaces are in interlocking frictional engagement.

4. The structure as defined in claim 3, wherein the imaginary longitudinal center line of said connecting bolt and the radius of curvature of said bearing surfaces intersect to form an angle of less than ten degrees.

5. The structure of claim 4, wherein the radius of curvature of said bearing surfaces intersects the imaginary longitudinal center line of said connecting bolt at an angle of approximately 7 degrees and is substantially normal to said imaginary line extending between the pivotal axis of the connecting bolt and the longitudinal axis of the annular clamping assembly for reducing the effective angle of friction between the complementary bearing surfaces to approximately 2 degrees.

6. Means for establishing a remotely rapidly disengageable fluid-tight coupling between the adjacent ends of two axially aligned fluid confining elements comprising: an outwardly flaring, radially outer peripherally extending surface on each of said elements leading substantially to each of said adjacent ends; an outwardly flaring, radially inner, peripherally extending, sealing surface on each of said elements leading substantially to each of said adjacent ends; a unitary sealing annulus essentially composed of hard metal or the like and including an inwardly tapering, radially outer peripherally extending sealing surface leading substantially to each end of said annulus, thereby defining two oppositely directed elastically deflectable sealing lips on said annulus; one of said sealing lip sealing surfaces when undeflected, being inclined to the longitudinal axis of said axially aligned fluid confining elements a lesser angle than the sealing surface on one of said axially aligned fluid confining elements and the other of said sealing lip sealing surfaces when undeflected being inclined to the longitudinal axis of said axially aligned fluid confining elements a lesser angle than the sealing surface on the other of said axially aligned fluid confining elements; said sealing annulus being interposed between the adjacent ends of said axially aligned fluid confining elements; and means for drawing said elements toward one another sufficiently to deflect said elastically deflectable sealing lips into cooperative sealing engagement with said element sealing surfaces, said last mentioned means including: an annular clamp comprising a plurality of arcuate segments having means securing said clamp segments to one another in endwise relationship; said clamp having two ends spaced along the longitudinal axis of the clamp; a first arcuate wedging surface defined on each clamp segment inner peripheral surface adjacent one end of said clamp, said first wedging surface being inclined toward the other end of said clamp; a second arcuate wedging surface defined on each clamp segment inner peripheral surface adjacent said clamp other end, said second wedging surface being inclined toward said one end of the clamp, said first arcuate wedging surfaces being arranged to cooperatively engage the outwardly flaring, radially outer peripherally extending surface on one of said axially aligned fluid confining elements and the second arcuate wedging surfaces being arranged to cooperatively engage the outwardly flaring, radially outer peripherally extending surface on the other of said axially aligned fluid confining elements when said clamp is utilized to make up said coupling; said segment endwise securing means including means defining a pivotal joint between at least one clamp segment end and one adjacent clamp segment end and rapidly, remotely disengageable locking means cooperatively carried by two of said clamp segments near one adjacent end of each of said last mentioned segments; said cooperatively carried remotely disengageable locking means including a shoulder extending laterally outwardly from one of said cooperating segments, a longitudinally elongated member pivotally secured at one end to the other of said cooperating segments and arranged to pivot generally laterally outwardly therefrom, means defining complementary arcuate bearing surfaces on said shoulder and on said longitudinally elongated member comprising a generally convex bearing surface on said shoulder and a generally concave bearing surface on said longitudinally elongated member, said bearing surfaces being arranged to coextensively engage one another, and said bearing surfaces having a common axis of curvature whose center is substantially offset toward the longitudinal axis of the annular clamp with respect to the pivotal axis of said longitudinally elongated member.

References Cited by the Examiner
UNITED STATES PATENTS

| | | | |
|---|---|---|---|
| 1,093,868 | 4/14 | Leighty | 285—367 |
| 1,662,311 | 3/28 | Hamer | 285—420 |
| 2,417,741 | 3/47 | Dillon | 24—279 |
| 2,648,552 | 8/53 | Livers et al. | 285—1 |
| 2,766,999 | 10/56 | Watts et al. | 285—367 |
| 2,882,071 | 4/59 | Klompar | 285—409 |

FOREIGN PATENTS 166,729  7/21  Great Britain.

CARL W. TOMLIN, *Primary Examiner.*